(12) United States Patent
Bernardele (10) Patent No.: US 10,486,769 B2
(45) Date of Patent: Nov. 26, 2019

(54) BICYCLE GEARSHIFT

(71) Applicant: CAMPAGNOLO S.r.l., Vicenza (IT)

(72) Inventor: Davide Bernardele, Caldogno (IT)

(73) Assignee: Campagnolo S.r.l., Vicenza (IT)

( * ) Notice: Subject to any disclaimer, the term of this patent is extended or adjusted under 35 U.S.C. 154(b) by 240 days.

(21) Appl. No.: 15/651,495

(22) Filed: Jul. 17, 2017

(65) Prior Publication Data
US 2018/0022417 A1    Jan. 25, 2018

(30) Foreign Application Priority Data

Jul. 21, 2016 (IT) ........................ 102016000076517

(51) Int. Cl.
| | | |
|---|---|---|
| *B62M 9/1244* | (2010.01) | |
| *B62M 9/125* | (2010.01) | |
| *B62M 9/128* | (2010.01) | |

(52) U.S. Cl.
CPC .......... *B62M 9/1244* (2013.01); *B62M 9/125* (2013.01); *B62M 9/128* (2013.01)

(58) Field of Classification Search
CPC .... B62M 9/125; B62M 9/1248; B62M 9/126; B62M 9/1244; B62M 9/121
USPC ...................................... 474/80, 82
See application file for complete search history.

(56) References Cited

U.S. PATENT DOCUMENTS

| | | | | |
|---|---|---|---|---|
| 4,235,118 A | * | 11/1980 | Huret ................... | B62M 9/1244 403/91 |
| 4,362,523 A | * | 12/1982 | Huret ................... | B62M 9/1246 474/82 |
| 4,690,663 A | * | 9/1987 | Nagano ................ | B62M 9/125 474/80 |
| 5,421,786 A | * | 6/1995 | Ando ..................... | B62K 19/30 474/78 |
| 5,498,211 A | * | 3/1996 | Hsu ....................... | B62M 9/1248 474/80 |

(Continued)

FOREIGN PATENT DOCUMENTS

| | | |
|---|---|---|
| EP | 1415901 A2 | 5/2004 |
| EP | 1902936 A1 | 3/2008 |
| EP | 2891601 A1 | 7/2015 |

OTHER PUBLICATIONS

Italian Search Report and Written Opinion in Italian Application No. 102016000076517, dated Apr. 10, 2017, with English translation.

*Primary Examiner* — Henry Y Liu
(74) *Attorney, Agent, or Firm* — Volpe and Koenig, P.C.

(57) ABSTRACT

The invention relates to a bicycle gearshift comprising a locking device acting between a connection member and a first body. The locking device comprises a pin slidable along a sliding axis in a through cavity formed on said first body and comprising an actuation end portion to be actuated in order to command shifting from a first operative configuration to a second operative configuration, and an opposite locking end portion that, when said locking device is in said second operative configuration, is in abutment against said connection member thus preventing a relative rotation between said first body and said connection member. When said locking device is in said second operative configuration said actuation end portion is arranged at one side of said connection member and said locking end portion is arranged at the other side of said connection member.

10 Claims, 10 Drawing Sheets

(56) References Cited

U.S. PATENT DOCUMENTS

| | | | | |
|---|---|---|---|---|
| 5,931,753 | A * | 8/1999 | Ichida | B62M 9/125 474/80 |
| 5,961,409 | A * | 10/1999 | Ando | B62M 9/1244 474/80 |
| 6,287,228 | B1 * | 9/2001 | Ichida | B62M 9/1248 474/80 |
| 6,793,598 | B1 * | 9/2004 | Savard | B62M 9/1248 474/80 |
| 7,090,603 | B2 * | 8/2006 | Shahana | B62J 23/00 474/80 |
| 7,722,488 | B2 * | 5/2010 | Kunisawa | B62M 9/126 474/80 |
| 7,905,804 | B2 * | 3/2011 | Yamaguchi | B62M 9/125 474/80 |
| 7,942,767 | B2 * | 5/2011 | Yamaguchi | B62M 9/125 474/102 |
| 7,963,870 | B2 * | 6/2011 | Deguchi | B62M 9/125 474/80 |
| 8,137,223 | B2 * | 3/2012 | Watarai | B62K 23/06 280/260 |
| 8,142,312 | B2 * | 3/2012 | Watarai | B62M 9/125 474/80 |
| 9,039,551 | B2 | 5/2015 | Böhm et al. | |
| 9,334,016 | B2 * | 5/2016 | Shahana | B62M 9/126 |
| 9,840,307 | B2 * | 12/2017 | Rosati | B62M 9/125 |
| 2004/0110587 | A1 * | 6/2004 | Shahana | B62J 23/00 474/80 |
| 2007/0202977 | A1 * | 8/2007 | Watarai | B62M 9/1242 474/82 |
| 2008/0051237 | A1 * | 2/2008 | Shahana | B62M 9/1244 474/82 |
| 2008/0125259 | A1 * | 5/2008 | Kunisawa | B62M 9/121 474/82 |
| 2009/0163310 | A1 * | 6/2009 | Yamaguchi | B62M 9/125 474/82 |
| 2013/0130853 | A1 * | 5/2013 | Bohm | B62M 9/124 474/80 |
| 2014/0018199 | A1 * | 1/2014 | Shahana | B62M 9/121 474/82 |
| 2015/0148159 | A1 * | 5/2015 | Rosati | B62M 9/125 474/80 |
| 2016/0176478 | A1 * | 6/2016 | Chang | B62M 9/121 474/69 |

\* cited by examiner

BICYCLE GEARSHIFT

CROSS REFERENCE TO RELATED APPLICATION

This application claims the benefit of Italian Application No. 102016000076517, filed on Jul. 21, 2016, which is incorporated herein by reference as if fully set forth.

FIELD OF INVENTION

The present invention relates to a bicycle gearshift, preferably a racing bicycle gearshift.

BACKGROUND

In the context of this description, the gearshift to which particular reference is made is the rear one, which moves the chain among the different sprockets of the sprocket assembly associated with the rear wheel of the bicycle.

The movement of the chain is typically actuated through the movement of a derailleur associated with an actuation linkage associated with the frame of the bicycle at the rear wheel.

The bicycle gearshift can be mechanically actuated or motorized. In the first case the movement of the derailleur is carried out by using a sheathed cable (so-called Bowden cable). In the second case the movement of the derailleur is carried out by using a drive member that is properly driven, typically electrically. The action exerted on the actuation linkage by the sheathed cable or by the drive member causes the deformation of the actuation linkage and, consequently, the movement of the derailleur.

The actuation linkage typically comprises a first body configured to be rotatably connected to the bicycle frame, a second body configured to support the derailleur and a pair of articulation rods that connect the first body and the second body.

Rear gearshifts provided with locking means of the gearshift in order to facilitate the dismounting/remounting of the rear wheel (for example in the case of a puncture to the tire of the rear wheel) are known. Such locking devices lock the gearshift in a pulled-back position with respect to the position occupied in the normal operation operative condition of the gearshift. This makes it possible to move the upper pulley of the derailleur of the gearshift into a position such as not to obstruct the dismounting and remounting of the rear wheel of the bicycle from/onto the bicycle frame.

EP 1902936 describes a locking device of a bicycle gearshift that is arranged between a connection member of the actuation linkage to the bicycle frame and the first body of the actuation linkage. The connection member is fixed to the frame through an attachment screw, whereas the first body is rotatably connected to the connection member at a rotation axis and moves between an unlocked position of the gearshift and a locked position of the gearshift, such positions being angularly spaced. The locking device is configured to selectively hold the first body in the locked position and comprises a first pin which acts on a spring housed in a blind cavity of the first body, wherein when the first body is in the locked position the spring is in a preloaded state and pushes the first pin in a recess formed in the connection member. Such a recess is defined in a stepped through hole formed in the connection member. A second pin is mounted in such a stepped through hole, said second pin comprising an actuation end portion that projects from the connection member on the opposite side with respect to the first body. The second pin is actuated to push the first pin outside of the recess, so as to be able to rotate the first body with respect to the connection member, bringing it into the unlocked position.

The Applicant has observed that the locking device of the bicycle gearshift described in the aforementioned prior art document needs two distinct cavities (blind cavity in the first body and stepped through hole in the connection member) in which two distinct pins (first pin and second pin) slide. This results in a constructive and structural complication. Furthermore, the two cavities, being exposed to the outside, can be receptacles of dirt or water, with the risk of compromising the correct operation of the locking device.

The problem at the basis of the present invention is to provide a bicycle gearshift comprising a locking device that is constructively simpler and more reliable than the one described above with reference to the prior art.

SUMMARY

The present invention therefore relates to a bicycle gearshift, comprising:

an actuation linkage configured to deform in order to move a derailleur of the gearshift, the actuation linkage comprising a first body configured to be rotatably connected to a bicycle frame, a second body configured to support the derailleur of the gearshift and a pair of articulation rods that connect the first body and the second body;

a connection member for connecting the actuation linkage to the bicycle frame, wherein the first body is rotatably connected to the connection member at a rotation axis and the connection member is configured to be fixed to the frame;

a locking device acting between said connection member and said first body and selectively actuatable to shift between a first operative configuration in which said first body is free to move about said rotation axis with respect to said connection member and a second operative configuration in which said first body is held in a predetermined angular position with respect to said connection member;

wherein the locking device comprises a pin slidable along a sliding axis in a through cavity formed on said first body and comprising an actuation end portion to be actuated in order to command the shifting from said first operative configuration to said second operative configuration, and an opposite locking end portion that, when said locking device is in said second operative configuration, is in abutment against said connection member thus preventing a relative rotation between said first body and said connection member, wherein when said locking device is in said second operative configuration said actuation end portion is arranged at one side of said connection member and said locking end portion is arranged at the other side of said connection member.

BRIEF DESCRIPTION OF THE DRAWINGS

Further features and advantages of the present invention will become clearer from the following detailed description of preferred embodiments thereof, made with reference to the attached drawings and given for indicating and not limiting purposes. In such drawings.

DETAILED DESCRIPTION OF THE PREFERRED EMBODIMENTS

The present invention relates to a bicycle gearshift, comprising:

an actuation linkage configured to deform in order to move a derailleur of the gearshift, the actuation linkage comprising a first body configured to be rotatably connected to a bicycle frame, a second body configured to support the derailleur of the gearshift and a pair of articulation rods that connect the first body and the second body;

a connection member for connecting the actuation linkage to the bicycle frame, wherein the first body is rotatably connected to the connection member at a rotation axis and the connection member is configured to be fixed to the frame;

a locking device acting between said connection member and said first body and selectively actuatable to shift between a first operative configuration in which said first body is free to move about said rotation axis with respect to said connection member and a second operative configuration in which said first body is held in a predetermined angular position with respect to said connection member;

wherein the locking device comprises a pin slidable along a sliding axis in a through cavity formed on said first body and comprising an actuation end portion to be actuated in order to command the shifting from said first operative configuration to said second operative configuration, and an opposite locking end portion that, when said locking device is in said second operative configuration, is in abutment against said connection member thus preventing a relative rotation between said first body and said connection member, wherein when said locking device is in said second operative configuration said actuation end portion is arranged at one side of said connection member and said locking end portion is arranged at the other side of said connection member.

Advantageously, the provision of a single pin sliding in a single through cavity makes the locking device of the invention constructively simpler and more reliable than the one described above with reference to the prior art.

In the locking device described above, the locking of the gearshift is obtained simply thanks to the abutment exerted on the connection member by the locking end portion of the pin.

Hereinbelow preferred features of the bicycle gearshift according to the present invention are described, wherein these features can be provided individually or in combination with each other.

Preferably, when said locking device is in said second operative configuration said locking end portion is in abutment against a lower surface and a rear surface of said connection member.

In the present description and in the following claims, the terms "lower", "rear" and "front" surfaces of the connection member are used to indicate surfaces that lie beneath, behind and in front of the connection member, respectively, making reference to the relative position thereof with respect to the first body and to the position of the connection member when mounted on the bicycle frame. In particular, a lower surface of the connection member is a downward-facing surface, a front surface of the connection member is on the side thereof facing towards the first body and a rear surface of the connection member is on the other side thereof facing the opposite way with respect to the first body.

In an embodiment of the invention, said locking end portion comprises a stem that ends with an enlarged head, wherein when said locking device is in said second operative configuration the stem is in abutment against said lower surface of said connection member and the enlarged head is in abutment against said rear surface of said connection member.

In an alternative embodiment, said locking end portion comprises a stem comprising a circumferential recess in which an elastic washer is housed, wherein when said locking device is in said second operative configuration the stem is in abutment against said lower surface of said connection member and the elastic washer is in abutment against said rear surface of said connection member.

Preferably, said locking device comprises an elastic element housed in a preloaded state in said through cavity and acting between said actuation end portion and an abutment surface defined in said through cavity.

More preferably, said elastic element is a helical spring.

Advantageously, when the locking device is in the first operative configuration thereof, i.e. when the locking end portion of the pin is not in abutment against the connection member, the elastic element is in a rest configuration and holds the pin away from the connection member.

In a first preferred embodiment of the invention, said connection member is a bracket rotatably connected to the first body through a first rotation pin coaxial to the rotation axis and configured to be fixed to the frame through a first attachment screw arranged at an attachment axis distinct from said rotation axis.

In a second preferred embodiment of the invention, said connection member is a bush rotatably connected to the first body through a second rotation pin coaxial to the rotation axis and configured to be fixed to the frame through a second attachment screw made in one piece with a free end of said second rotation pin.

Advantageously, the bush makes it possible to give a greater compactness to the bicycle gearshift. Thanks to the fact that the second rotation pin is made in one piece with the second attachment screw, a faster mounting/dismounting of the bicycle gearshift onto/from the frame is also obtained.

Preferably, said connection member and said first body comprise end stop adjustment means configured to adjust an end stop angular position of said first body with respect to said connection member when said locking device is in said first operative configuration.

More preferably, said end stop adjustment means comprise an adjustment screw screwed into a threaded seat integrally formed with one of said connection member and said first body, and having an end portion in abutment on an abutment element fixedly associated with the other of said connection member and said first body.

In a preferred embodiment of the invention, an elastic torsion element is provided between said connection member and said first body, said elastic torsion element being coaxial to said rotation axis.

Preferably, said elastic torsion element is a helical torsion spring.

Advantageously, thanks to the provision of the elastic torsion element, the second operative configuration is maintained in an extremely stable manner, thus reducing the risk of the bicycle gearshift to accidentally lose the second configuration when possible knocks are received during the dismounting step of the wheel.

In FIGS. 1-5, reference numeral 10 indicates a bicycle gearshift, particularly a rear gearshift, according to a first preferred embodiment of the present invention.

The rear gearshift 10 is mounted on a bicycle frame 12 (FIGS. 1 and 2) and moves the chain (not shown) among the different sprockets 14 of the sprocket assembly 16 associated with the rear wheel (not shown) of the bicycle.

The movement of the chain is actuated through the movement of a derailleur 18 (or chain-guide) associated with an actuation linkage 20.

The gearshift 10 can be mechanically actuated or motorized. The attached figures show, as a non-limiting example, a motorized gearshift, wherein the movement of the derailleur 18 is carried out by using a drive member 22 that is properly driven, typically electrically. Once driven, the actuation linkage 20 deforms in order to move the derailleur 18.

The actuation linkage 20 is an articulated quadrilateral linkage, preferably in the form of an articulated parallelogram. It comprises a first body 24 configured to be rotatably connected to the bicycle frame 12, a second body 26 configured to support the derailleur 18 and a pair of articulation rods 28 that connect the first body 24 and the second body 26. The rods 28 are also respectively called "inner rod" and "outer rod", with reference to their relative position with respect to the frame of the bicycle.

A pre-tensioning spring is arranged between the second body 26 and the derailleur 18 in a per se conventional manner.

In the example illustrated here, the drive member 22 is housed in the first body 24 and commands the deformation of the actuation linkage 20, lengthening or shortening a diagonal of the articulated quadrilateral. In particular, a lengthening of such a diagonal is used to carry out upward gearshifting (towards a sprocket 14 having a larger diameter), whereas vice-versa a shortening of the diagonal is used for downward gearshifting (towards a sprocket 14 having a smaller diameter).

The drive member 22 comprises an electric motor 22a (powered and driven by means of cables and drive members 22b) fixedly connected to the first body 24, and a motion transmission element 22c driven in rotation by the electric motor 22a. For example, the motion transmission element 22c is defined by a motion transmission shaft of the electric motor 22a.

The gearshift 10 comprises a connection member 30 for connecting the actuation linkage 20 to the bicycle frame 12. Such a connection member 30 is fixed to the frame 12.

The first body 24 is rotatably connected to the connection member 30 at a rotation axis X. Preferably, no elements are provided between the connection member 30 and the frame 12 for adjusting the reciprocal position thereof.

Figure 1:
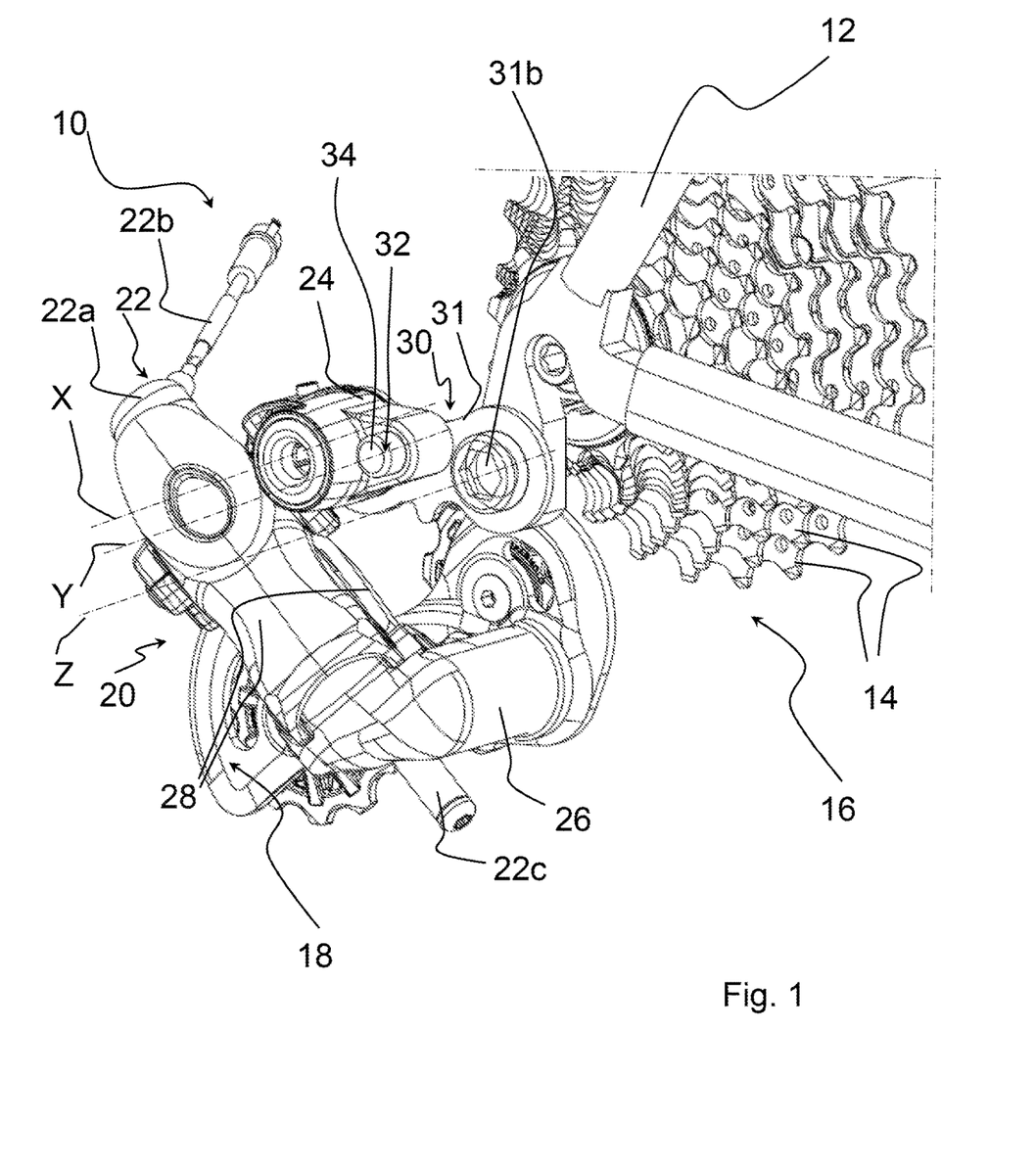
FIG. 1 is a perspective view of a first preferred embodiment of a bicycle gearshift in accordance with the present invention, wherein the bicycle gearshift is in a normal operation operative configuration thereof.
Figure 2:
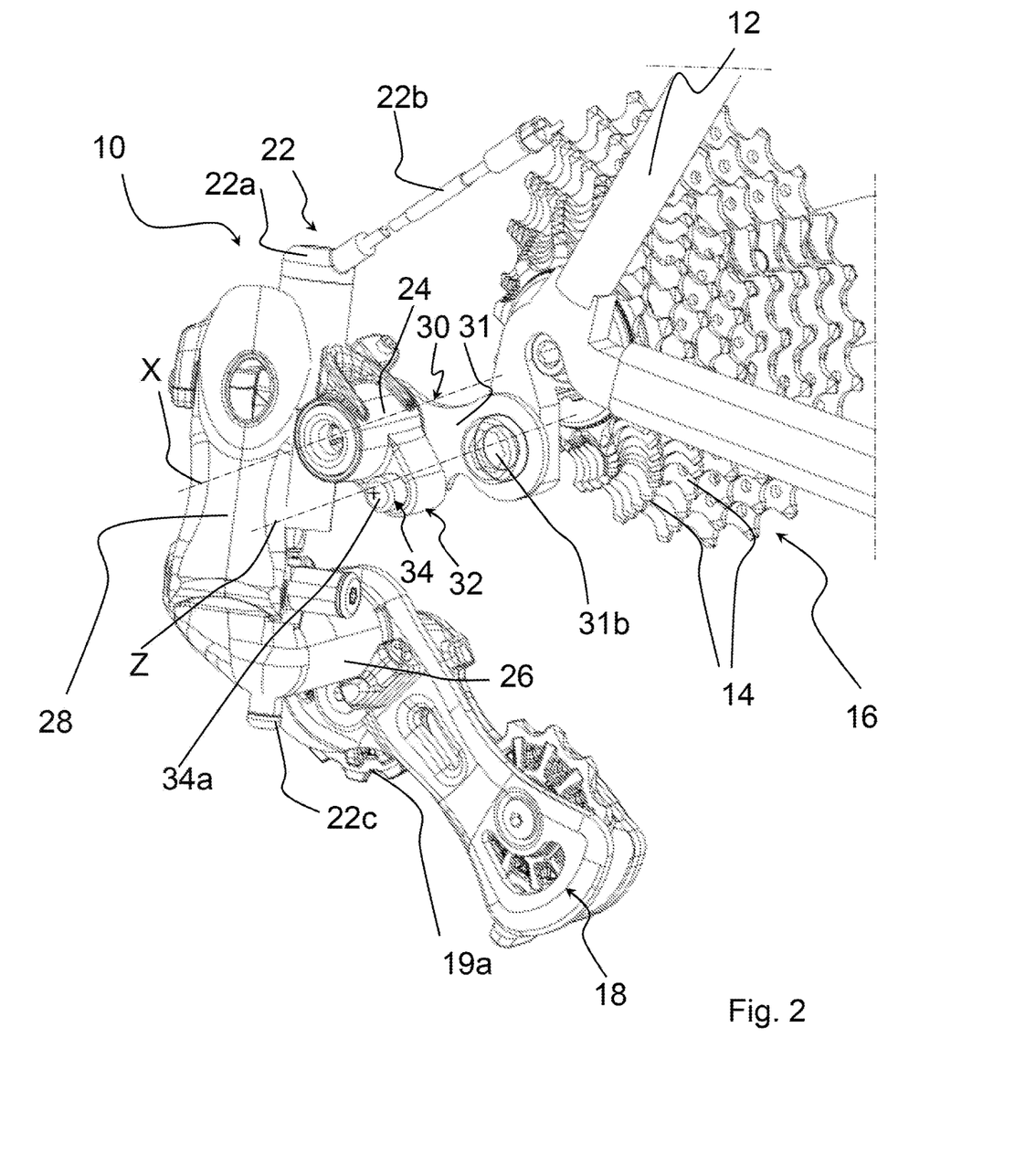
FIG. 2 is a perspective view of the bicycle gearshift of FIG. 1, wherein the bicycle gearshift is in a locked operative configuration.
Figure 3:
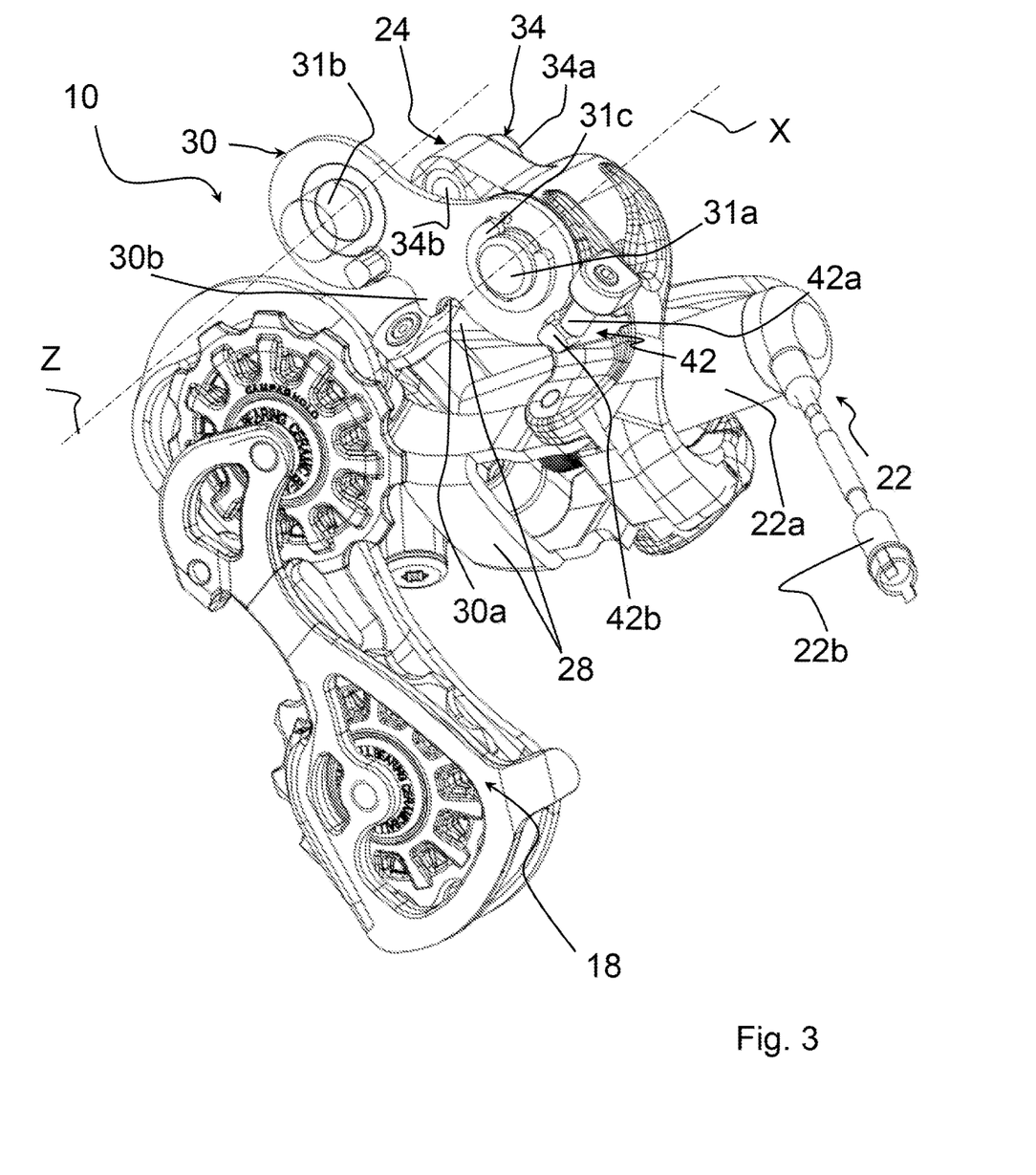
FIG. 3 is a further perspective view of the bicycle gearshift of FIG. 1, such a view being taken from a viewpoint opposite to that of FIG. 1.

In particular, in this first preferred embodiment of the invention, the connection member 30 is a bracket 31 rotatably connected to the first body 24 through a first rotation pin 31a coaxial to the rotation axis X and fixed to the frame 12 through a first attachment screw 31b arranged at an attachment axis Z distinct from the rotation axis X (FIGS. 2 and 3). Preferably, the attachment axis Z is substantially parallel to the rotation axis X (as shown in FIG. 1).

Figure 4:
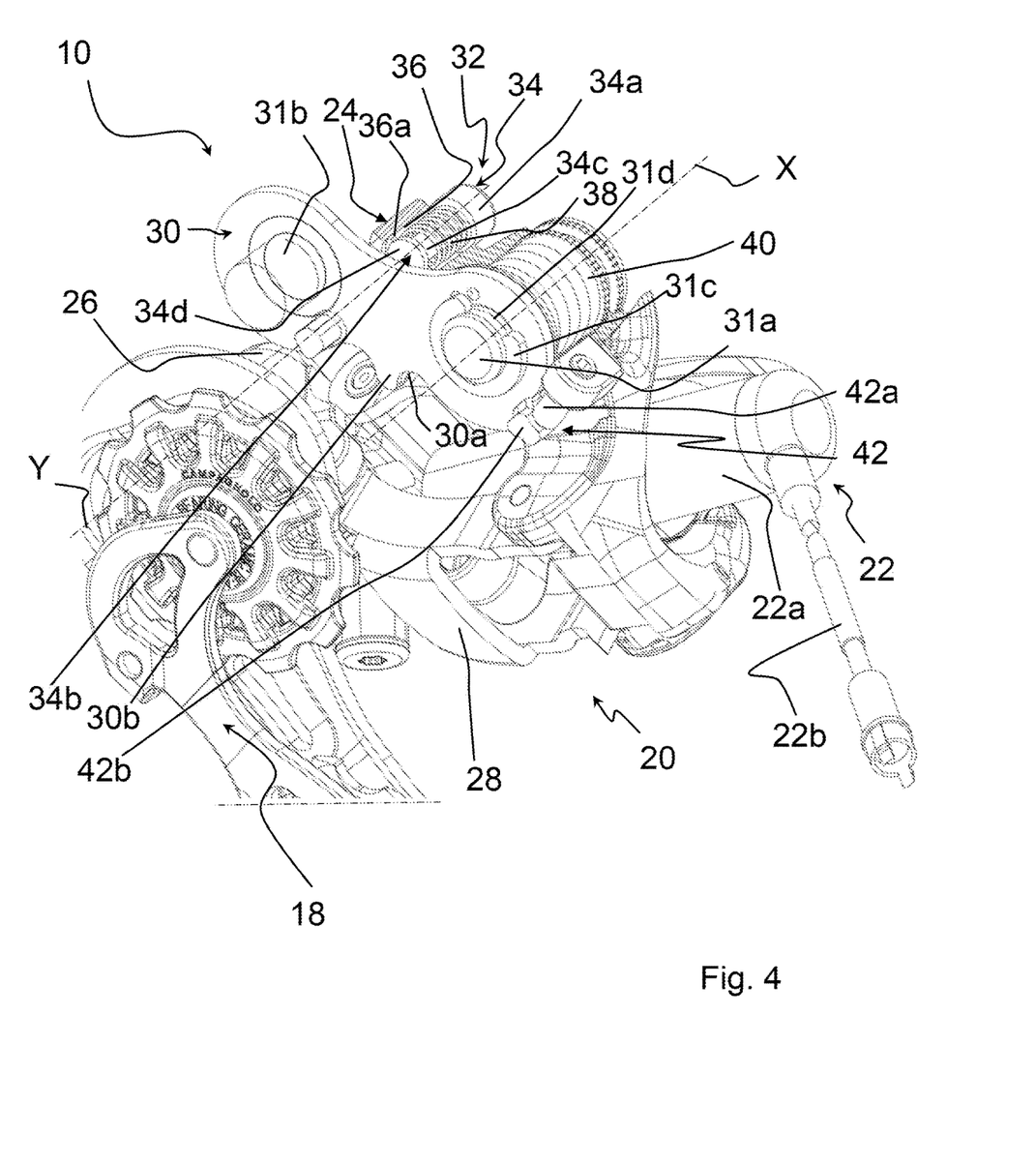
FIG. 4 is a partially sectioned perspective view of an enlarged portion of the bicycle gearshift of FIG. 3.
Figure 5:
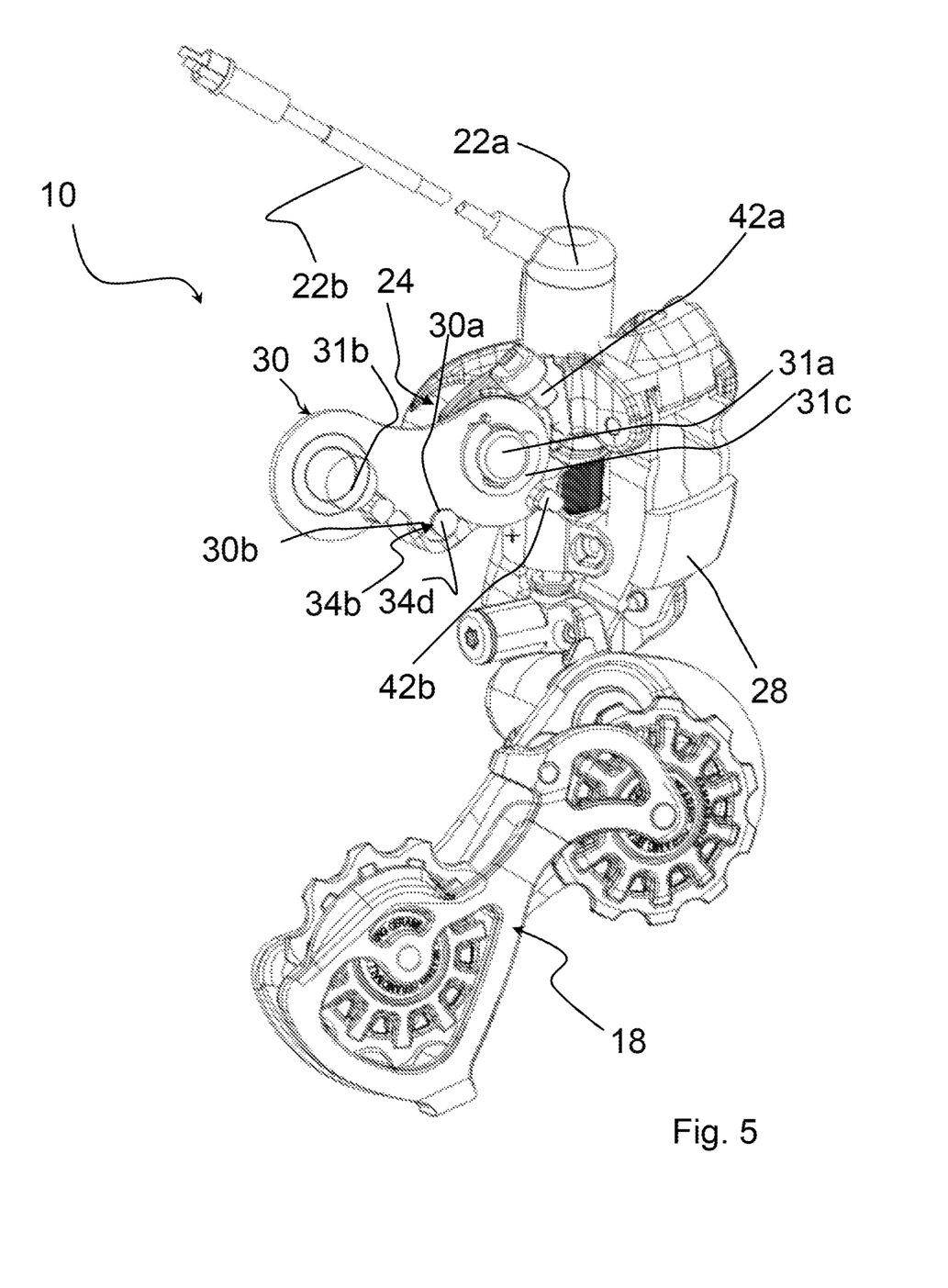
FIG. 5 is a further perspective view of the bicycle gearshift of FIG. 2, such a view being taken from a viewpoint opposite to that of FIG. 2.

As shown in FIGS. 3 and 4, the first rotation pin 31a is mounted on the connection member through an elastic washer 31c fitted in a circumferential recess 31d thereof. Preferably, the elastic washer 31c is shaped like an open ring.

The gearshift 10 further comprises a locking device 32 acting between the connection member 30 and the first body 24.

The locking device 32 is selectively actuatable to shift between a first operative configuration (shown in FIGS. 1, 3 and 4) in which the first body 24 is free to move about the rotation axis X with respect to the connection member 30 and a second operative configuration (shown in FIGS. 2 and 5) in which the first body 24 is held in a predetermined angular position with respect to the connection member 30.

As shown in FIG. 2, in the second operative configuration the gearshift 10 is in a pulled-back position with respect to the position occupied in the first normal operation operative configuration of the gearshift 10, shown in FIG. 1. This makes it possible to move away the upper pulley or sprocket 19a of the derailleur 18 below the sprocket assembly 16, which would otherwise prevent the dismounting of the rear wheel from the frame of the bicycle. In practice, the upper pulley 19a of the derailleur 18 is moved and leaves below the sprocket assembly 16 sufficient space free to dismount and remount the wheel.

The locking device 32 comprises a pin 34 that is configured to slide along a sliding axis Y in a through cavity 36 formed on the first body 24. Preferably, the sliding axis Y is substantially parallel to the rotation axis X (as shown in FIG. 1).

The pin 34 comprises an actuation end portion 34a (preferably configured like a button) to be actuated in order to command the shifting from the first operative configuration to the second operative configuration.

The pin 34 further comprises an opposite locking end portion 34b. As clearly shown in FIGS. 2 and 5, when the locking device 32 is in the second operative configuration, the locking end portion 34b is in abutment against lower and rear surfaces of the connection member 30 thus preventing the relative rotation between the first body 24 and the connection member 30. In such an operative configuration, the locking end portion 34b is therefore arranged at a side of the connection member 30 opposite to the one in which the actuation end portion 34a is arranged. In particular, the actuation end portion 34a is arranged at a front side of the connection member 30, i.e. on the side thereof facing towards the first body 24, and the locking end portion 34b is on the other rear side thereof facing the opposite way with respect to the first body 24.

In this first preferred embodiment of the invention, the locking end portion 34b comprises a stem 34c that ends with an enlarged head 34d, as shown in FIG. 4. When the locking device 32 is in the second operative configuration, the stem 34c is in abutment against a lower surface of the connection member 30 and the enlarged head 34d is in abutment against a rear surface of the connection member 30. The abutment between stem 34c of the locking end portion 34b of the pin 34 and the connection member 30 takes place at a shaped housing seat 30a formed in the connection member 30. Such a shaped housing seat 30a is defined by a recess which in turn is defined by a projecting portion 30b which projects from the lower surface of the connection member 30.

As shown in FIG. 4, the locking device 32 further comprises an elastic element 38 housed in a preloaded state in the through cavity 36. The elastic element 38 of the non-limiting example of FIG. 4 is a helical spring. The elastic element 38 acts between the actuation end portion 34a and an abutment surface 36a defined in the through cavity 36.

Furthermore, as shown in FIG. 4, the locking device 32 comprises an elastic torsion element 40 arranged between the connection member 30 and the first body 24. The elastic torsion element 40 is coaxial to the rotation axis X. The elastic torsion element 40 of the non-limiting example of FIG. 4 is a helical torsion spring mounted about the first rotation pin 31a.

The connection member 30 and the first body 24 comprise end stop adjustment means 42 configured to adjust an end stop angular position of the first body 24 with respect to the connection member 30 when the locking device 32 is in the first operative configuration.

In the non-limiting example shown in the figures, the end stop adjustment means 42 comprise an adjustment screw 42a screwed into a threaded seat integrally formed with the first body 24 and having an end portion in abutment on an abutment element 42b fixedly associated with the connection member 30. Alternatively, a variant embodiment is possible (not shown) in which the adjustment screw 42a is screwed into a threaded seat integrally formed with the connection member 30 and the abutment element 42b is fixedly associated with the first body 24.

Figure 6:
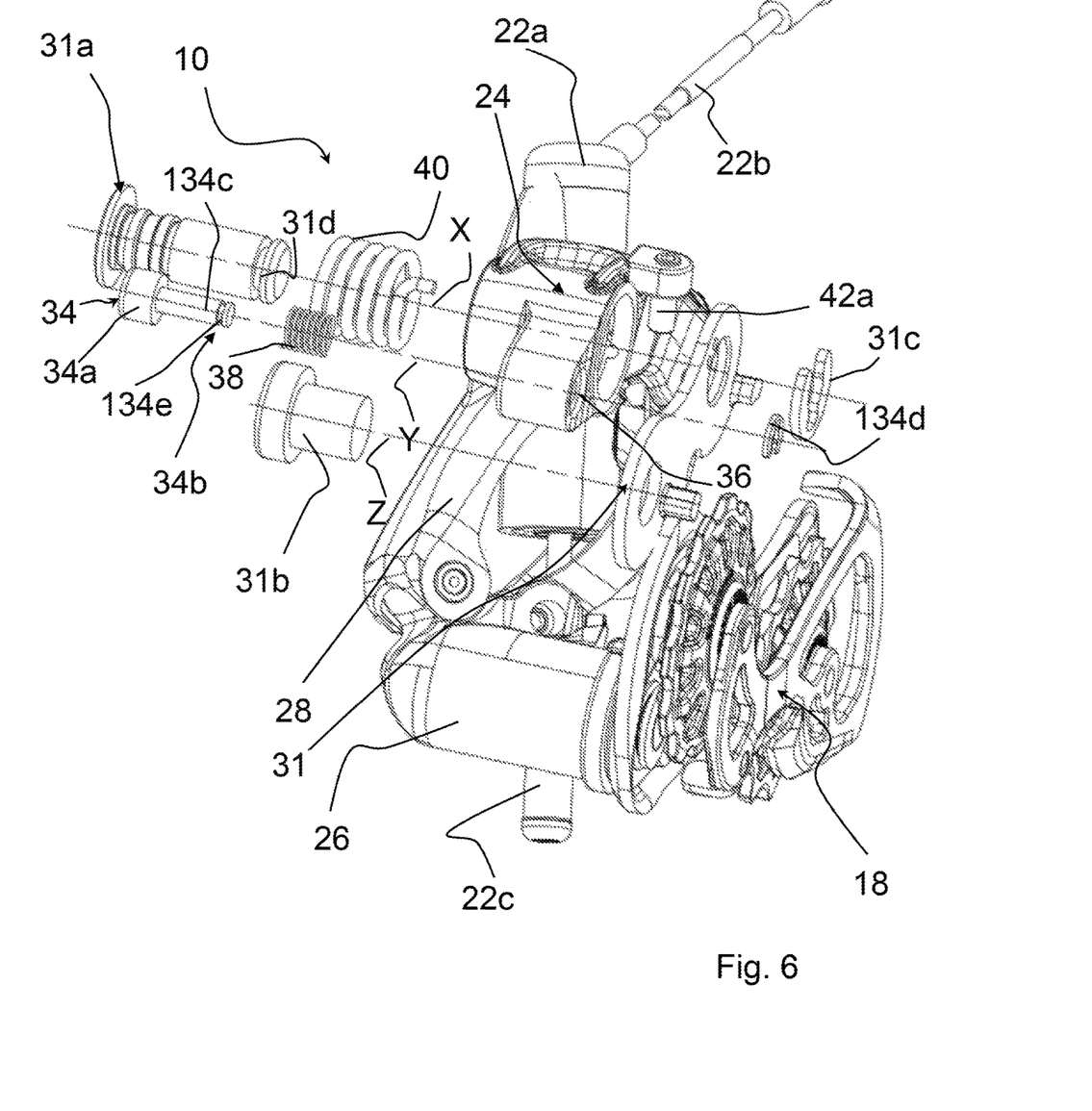
FIG. 6 is an exploded perspective view of a second preferred embodiment of a bicycle gearshift in accordance with the present invention.
Figure 7:
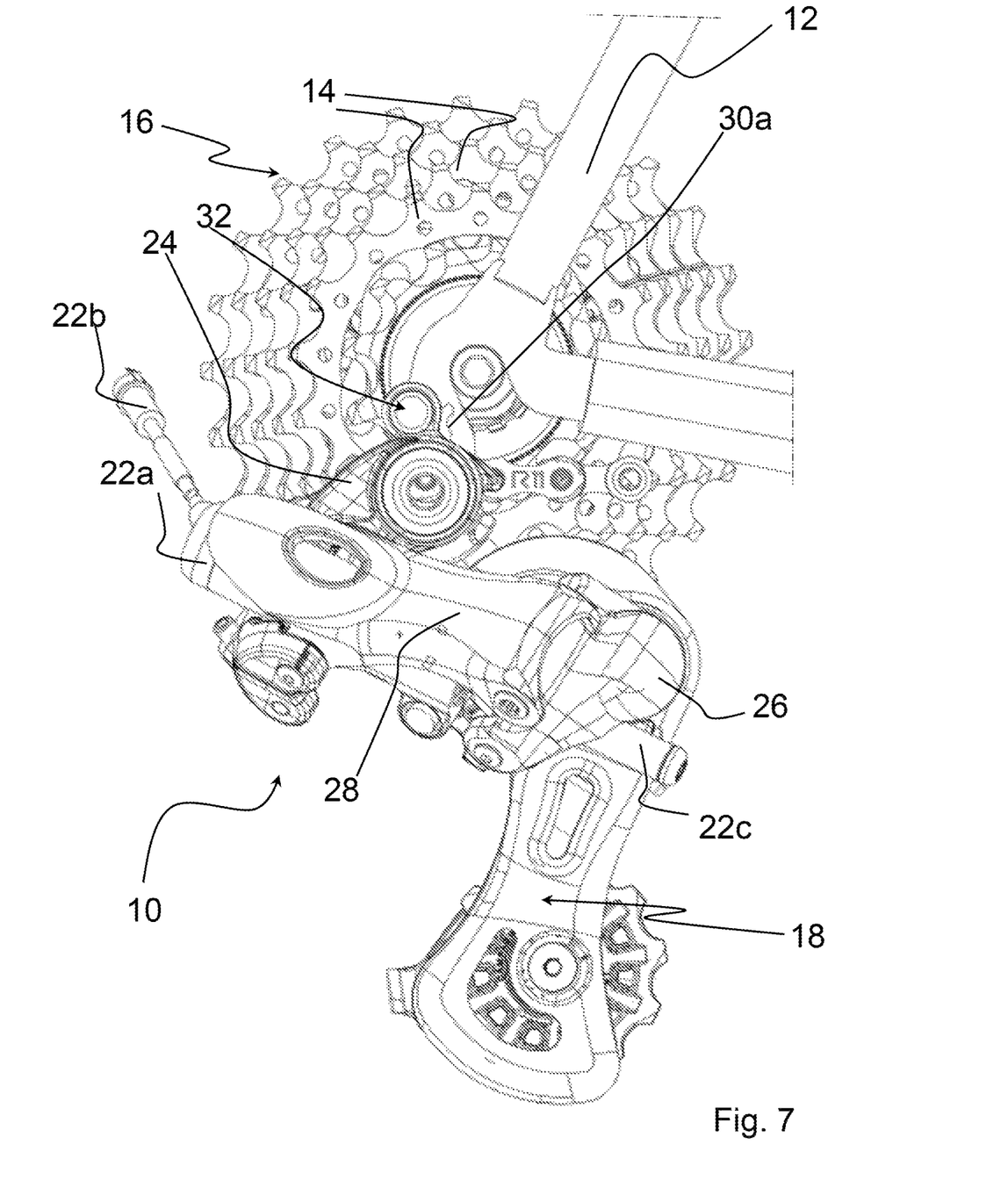
FIG. 7 is a perspective view of a third preferred embodiment of a bicycle gearshift in accordance with the present invention, wherein the bicycle gearshift is in a normal operation operative configuration thereof.
Figure 8:
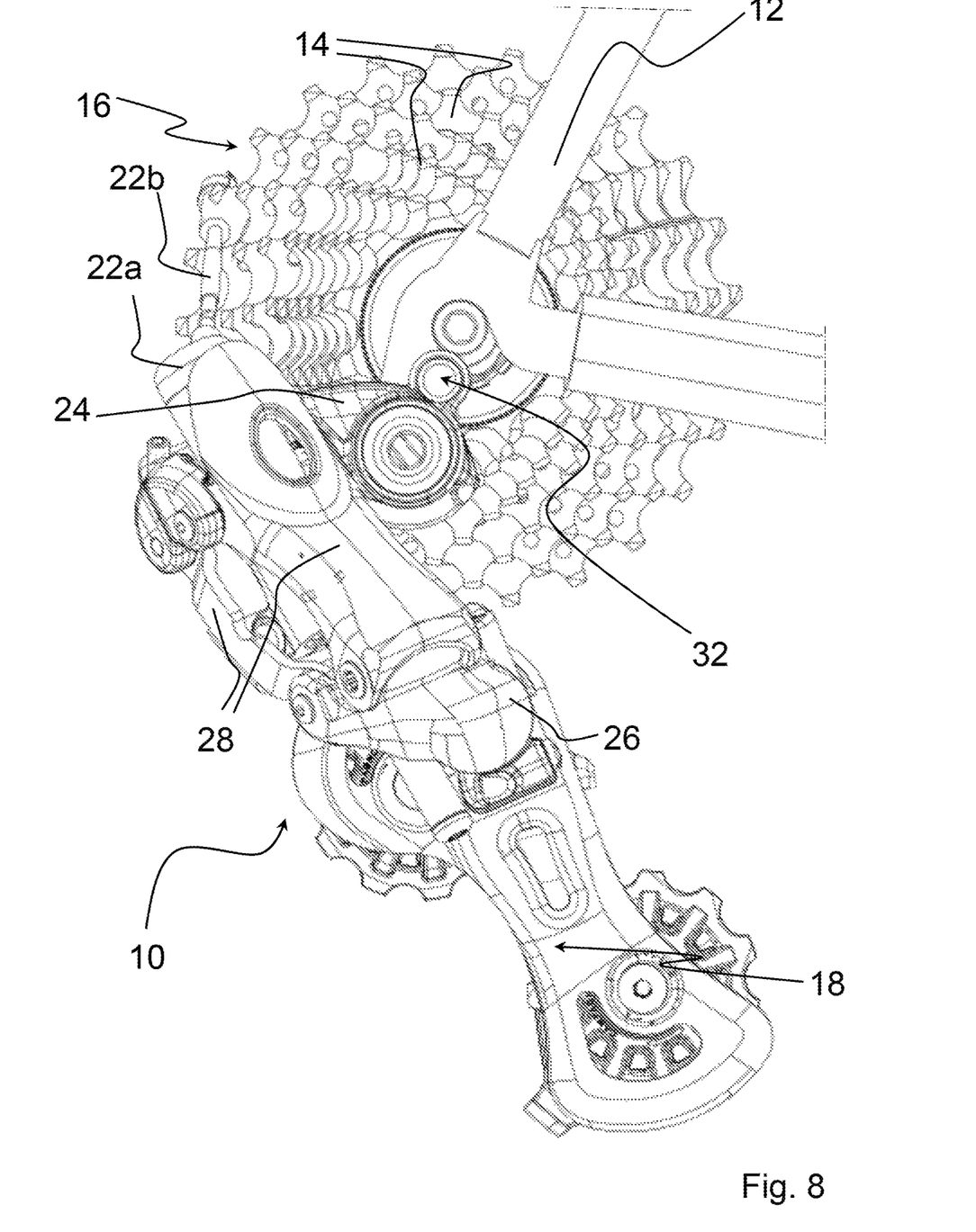
FIG. 8 is a perspective view of the bicycle gearshift of FIG. 7, wherein the bicycle gearshift is in a locked operative configuration.
Figure 9:
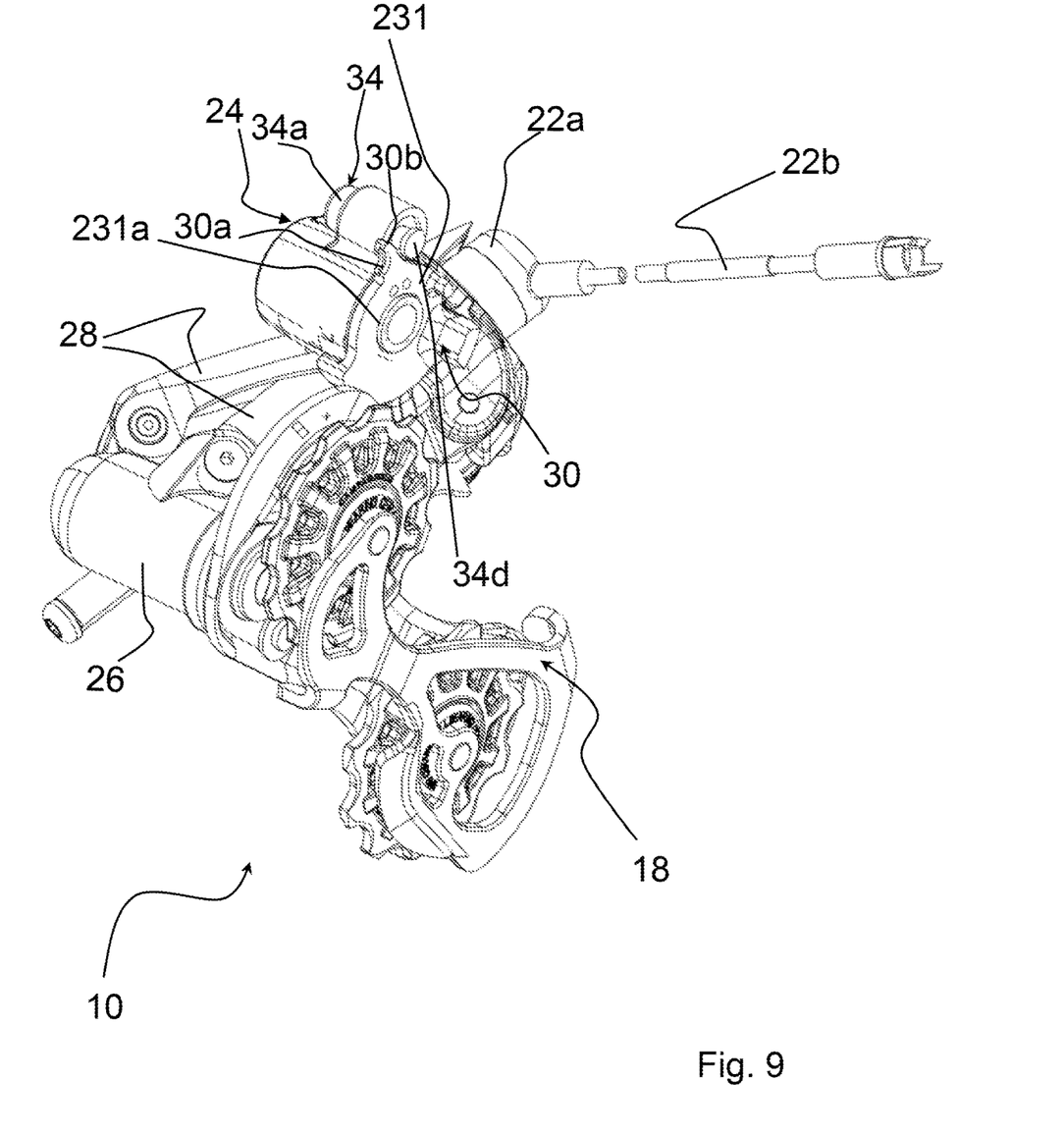
FIG. 9 is a further perspective view of the bicycle gearshift of FIG. 7, such a view being taken from a viewpoint opposite to that of FIG. 7.
Figure 10:
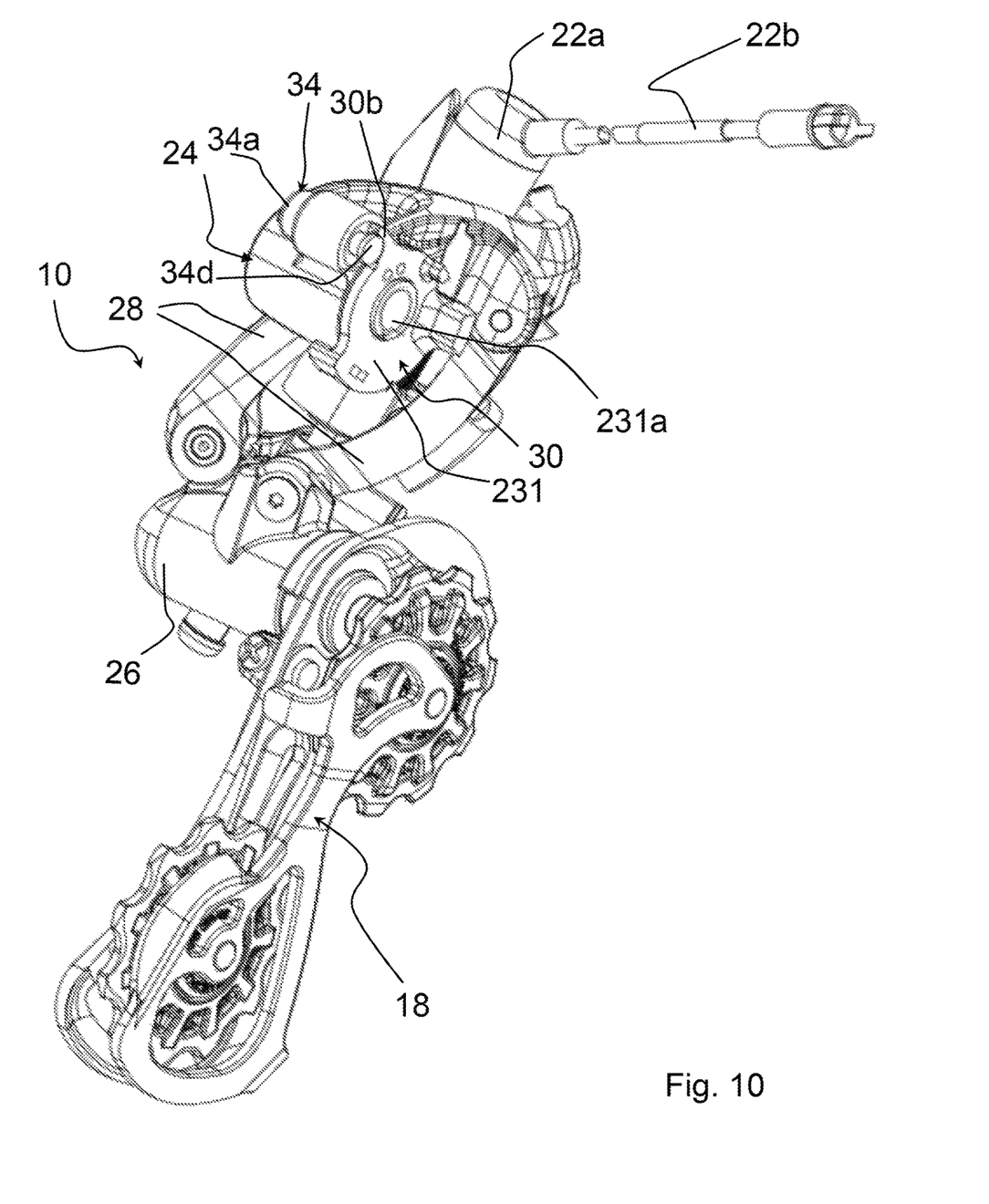
FIG. 10 is a further perspective view of the bicycle gearshift of FIG. 8, such a view being taken from a viewpoint opposite to that of FIG. 8.

FIG. 6 shows a second preferred embodiment of a bicycle gearshift 10 according to the present invention.

The components of the bicycle gearshift 10 of FIG. 6 similar or functionally equivalent to those of the bicycle gearshift 10 of FIGS. 1-5 are indicated with the same reference numeral and for a description thereof reference should be made to what stated above.

The bicycle gearshift 10 of FIG. 6 differs from the bicycle gearshift 10 of FIGS. 1-5 substantially solely in the pin 34 of the locking device 32, in particular in the locking end portion 34b of the pin 34.

In this second preferred embodiment, the locking end portion 34b comprises a stem 134c comprising a circumferential recess 134e in which a respective elastic washer 134d is housed. When the locking device 32 is in the second operative configuration, the stem 134c is in abutment against a lower surface of the connection member 30 and the elastic washer 134d is in abutment against a rear surface of the connection member 30. Preferably, the elastic washer 134d is shaped like an open ring.

The elastic washer 134d of the pin 34 of the bicycle gearshift 10 of FIG. 6 thus performs the same function performed by the enlarged head 34d of the pin 34 of the bicycle gearshift 10 of FIGS. 1-5.

FIGS. 7-10 show a third preferred embodiment of a bicycle gearshift according to the present invention.

The components of the bicycle gearshift 10 of FIGS. 7-10 similar or functionally equivalent to those of the bicycle gearshift 10 of FIGS. 1-5 are indicated with the same reference numeral and for a description thereof reference should be made to what is outlined above.

The bicycle gearshift 10 of FIGS. 7-10 differs from the bicycle gearshift 10 of FIGS. 1-5 substantially solely in that the connection member 30 is a bush 231, instead of a bracket 31.

Such a bush 231 is rotatably connected to the first body 24 through a second rotation pin 231a coaxial to the rotation axis X and fixed to the frame through a second attachment screw (not shown), which is preferably made in one piece at a free end of the second rotation pin 231a. The second attachment screw is coaxial to the second rotation pin 231a and is therefore coaxial to the rotation axis X.

During travel, the bicycle gearshift 10 is normally in the first operative configuration (shown in FIGS. 1, 3, 4, 7 and 9) in which the first body 24 is free to move about the rotation axis X with respect to the connection member 30 in order to allow the movement of the chain among the different sprockets 14 of the sprocket assembly 16 associated with the rear wheel of the bicycle.

In order to allow the positioning of the derailleur 18 in a position suitable for making easier the changing of the rear wheel of the bicycle, the locking device 32 is actuated to shift to the second operative configuration (shown in FIGS. 2, 5, 8 and 10), wherein the first body 24 is positioned and kept in a predetermined angular position with respect to the connection member 30.

As discussed earlier, in the second operative configuration the gearshift 10 is in a position in which the upper pulley 19b of the derailleur 18 (which is the one that generally prevents the exit of the rear wheel of the bicycle from its seat) is moved and leaves beneath the sprocket assembly 16 a space substantially free.

The locking device 32 is particularly useful mainly in gearshifts provided with a clutch for stabilizing the vibrations of the chain, wherein such a clutch is an additional obstacle in dismounting the rear wheel.

The first body 24 is made to rotate about the rotation axis X in one direction of rotation (clockwise, with reference to FIGS. 1 and 7) until it reaches a predetermined angular position with respect to the connection member 30 so that the actuation end portion 34a can be pushed to move the locking end portion 34b of the pin 34 up to and beyond the connection member 30. At this point the first body 24 and the actuation end portion 34a are released, obtaining an abutment between the lower surface of the connection member 30 and the stem 34c, 134c of the locking end portion 34b at the shaped housing seat 30a of the connection member 30 and, through the effect of the elastic return action exerted by the elastic element 38 on the pin 34, an abutment between the locking end portion 34b and the rear surface of the connection member 30. In this way, the locking of the gearshift 10 in the aforementioned angular position is obtained. In such a position, indeed, the first body 24 cannot rotate in the opposite direction of rotation (counter-clockwise, with reference to FIGS. 1 and 7).

During the rotation of the first body 24 to reach the second operative configuration, the derailleur 18 extends through the pulling of the chain and, particularly, the upper pulley 19a of the derailleur 18 frees a passage under the sprocket assembly 16 for the extraction of the rear wheel.

In order to bring the gearshift 10 back into the first operative configuration it is sufficient to slightly rotate the first body 24 in the aforementioned direction of rotation (clockwise, with reference to FIGS. 1 and 7), so that the locking end portion 34b of the pin 34 releases from the connection member 30 due to the elastic return action exerted by the elastic element 38 on the pin 34. Thereafter, the gearshift 10 is brought back into the first operative configuration by rotating the first body 24 in the opposite direction of rotation (counter-clockwise, with reference to FIGS. 1 and 7).

When the locking device 32 is "unlocked", the first body 24 goes into the first operative configuration, and, with respect to the connection member 30, takes up a working and end stop reciprocal angular position, due to the pulling exerted by the chain that acts on the derailleur 18. The end stop adjustment means 42 have the function of adjusting the end stop angular position of the first body 24 with respect to the connection member 30 when the locking device 32 is in the first operative configuration.

The possible elastic torsion element 40 provided between the connection member 30 and the first body 24 is loaded upon rotating the first body 24 in the aforementioned direction of rotation (clockwise, with reference to FIGS. 1 and 7), so that the second operative configuration can be maintained in an extremely stable manner.

Of course, those skilled in the art can make numerous changes and variants to the bicycle gearshift described above in order to satisfy specific and contingent requirements, all of which are in any case encompassed by the scope of protection of the present invention as defined by the following claims.

In particular, in the third preferred embodiment of FIGS. 7-10, a pin 34 could be used in which the locking end portion 34b is of the type illustrated in the second preferred embodiment of FIG. 6, i.e. the pin 34 provided with a respective elastic washer 134d.

Furthermore, in all of the preferred embodiments discussed above, the through cavity 36 could be formed on the connection member 30 and in this case the locking end portion 34b of the pin 34 would be in abutment against the first body 24, with a clear operation analogy with respect to what has been discussed above.

What is claimed is:

1. A bicycle gearshift comprising:
an actuation linkage configured to deform in order to move a derailleur of the gearshift, the actuation linkage comprising a first body configured to be rotatably connected to a bicycle frame, a second body configured to support the derailleur of the gearshift and a pair of articulation rods that connect the first body and the second body;
a connection member for connecting the actuation linkage to the bicycle frame, wherein the first body is rotatably connected to the connection member at a rotation axis (X) and the connection member is configured to be fixed to the frame;
a locking device acting between said connection member and said first body and selectively actuatable to shift between a first operative configuration in which said first body is free to move about said rotation axis (X) with respect to said connection member and a second operative configuration in which said first body is held in a predetermined angular position with respect to said connection member;
wherein said locking device comprises a pin slidable along a sliding axis (Y) in a through cavity formed on said first body and comprising an actuation end portion to be actuated in order to command the shifting from said first operative configuration to said second operative configuration, and an opposite locking end portion that, when said locking device is in said second operative configuration, is in abutment against said connection member thus preventing a relative rotation between said first body and said connection member, wherein when said locking device is in said second operative configuration said actuation end portion is arranged at one side of said connection member and said locking end portion is arranged at an other side of said connection member.

2. The gearshift according to claim 1, wherein when said locking device is in said second operative configuration said locking end portion is in abutment against a lower surface and a rear surface of said connection member.

3. The gearshift according to claim 2, wherein said locking end portion comprises a stem that ends with an enlarged head, wherein when said locking device is in said second operative configuration the stem is in abutment against said lower surface of said connection member and the enlarged head is in abutment against said rear surface of said connection member.

4. The gearshift according to claim 2, wherein said locking end portion comprises a stem comprising a circumferential recess in which an elastic washer is housed, wherein when said locking device is in said second operative configuration the stem is in abutment against said lower surface of said connection member and the elastic washer is in abutment against said rear surface of said connection member.

5. The gearshift according to claim 1, wherein said locking device comprises an elastic element housed in a preloaded state in said through cavity and acting between said actuation end portion and an abutment surface defined in said through cavity.

6. The gearshift according to claim 1, wherein said connection member is a bracket rotatably connected to the first body through a first rotation pin coaxial to the rotation axis (X) and configured to be fixed to the frame through a first attachment screw arranged at an attachment axis (Z) distinct from said rotation axis (X).

7. The gearshift according to claim 1, wherein said connection member is a bush rotatably connected to the first body through a second rotation pin coaxial to the rotation axis (X) and configured to be fixed to the frame through a second attachment screw made in one piece with a free end of said second rotation pin.

8. The gearshift according to claim 1, wherein said connection member and said first body comprise end stop adjustment means configured to adjust an end stop angular position of said first body with respect to said connection member when said locking device is in said first operative configuration.

9. The gearshift according to claim 8, wherein said end stop adjustment means comprise an adjustment screw screwed into a threaded seat integrally formed with one of said connection member and said first body and having an end portion in abutment on an abutment element fixedly associated with the other of said connection member and said first body.

10. The gearshift according to claim 1, wherein an elastic torsion element is provided between said connection member and said first body, said elastic torsion element being coaxial to said rotation axis (X).

* * * * *